US011373507B2

(12) United States Patent
Kajiyama et al.

(10) Patent No.: US 11,373,507 B2
(45) Date of Patent: Jun. 28, 2022

(54) CONTINUAL ENGAGEMENT SUPPORT DEVICE, PORTABLE TERMINAL, CONTINUAL ENGAGEMENT SUPPORT METHOD, AND PROGRAM

(71) Applicant: NEC Solution Innovators, Ltd., Tokyo (JP)

(72) Inventors: Ikuo Kajiyama, Tokyo (JP); Jou Akitomi, Tokyo (JP); Miho Ishii, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 17/273,349

(22) PCT Filed: Jun. 26, 2019

(86) PCT No.: PCT/JP2019/025399
  § 371 (c)(1),
  (2) Date: Mar. 4, 2021

(87) PCT Pub. No.: WO2020/049839
  PCT Pub. Date: Mar. 12, 2020

(65) Prior Publication Data
  US 2021/0201649 A1   Jul. 1, 2021

(30) Foreign Application Priority Data
  Sep. 4, 2018 (JP) .............................. JP2018-165203

(51) Int. Cl.
  *G08B 23/00* (2006.01)
  *G08B 21/18* (2006.01)
  (Continued)

(52) U.S. Cl.
  CPC ......... *G08B 21/182* (2013.01); *G08B 25/016* (2013.01); *G08B 27/005* (2013.01); *G08B 21/06* (2013.01)

(58) Field of Classification Search
  CPC .. G08B 21/182; G08B 25/016; G08B 27/005; G08B 21/06
  (Continued)

(56) References Cited

U.S. PATENT DOCUMENTS 8,193,918 B1 *   6/2012   Shavelsky ................. A61J 7/04
                                                                       700/242
9,196,148 B1 *   11/2015   Hutz ....................... G08B 29/02
  (Continued)

FOREIGN PATENT DOCUMENTS

JP   2006-350519 A   12/2006
JP   2010-165167 A    7/2010
  (Continued)

OTHER PUBLICATIONS

International Search Report for PCT Application No. PCT/JP2019/025399, dated Sep. 24, 2019.

*Primary Examiner* — Zhen Y Wu

(57) ABSTRACT

The continual engagement support device 600 includes: the performance data storage means 601 that stores performance data including time data indicating the time of performance and sensor data of the time of performance or the surrounding time obtained from the sensors mounted on the portable terminal when the target action is performed via the portable terminal possessed by the target user; the timing detection means 602 that detects the performance timing, which is the timing at which the target user is likely to perform the target action during the predetermined cycle, on the basis of the performance data; and the notification means 603 provides a notification to prompt the performance of the target action (Continued)

at the detected performance timing when the target action is not performed for a predetermined period of time or longer.

10 Claims, 5 Drawing Sheets

(51) Int. Cl.
*G08B 25/01* (2006.01)
*G08B 27/00* (2006.01)
*G08B 21/06* (2006.01)

(58) Field of Classification Search
USPC .................................................. 340/573.1
See application file for complete search history.

(56) References Cited

U.S. PATENT DOCUMENTS

| 10,049,558 | B2* | 8/2018 | Funakoshi | H04L 67/26 |
| 10,219,127 | B2* | 2/2019 | Mochizuki | H04W 4/023 |
| 10,748,094 | B2* | 8/2020 | Funakoshi | G06F 3/0488 |
| 10,769,185 | B2* | 9/2020 | Bradley | G06F 16/3329 |
| 2003/0020599 | A1* | 1/2003 | Somers | G16H 20/10 340/457 |
| 2010/0188230 | A1* | 7/2010 | Lindsay | G16H 40/63 715/866 |
| 2012/0313785 | A1* | 12/2012 | Hanson | A61B 5/1113 340/573.1 |
| 2016/0026978 | A1 | 1/2016 | Li et al. | |
| 2016/0085591 | A1* | 3/2016 | Taira | G06F 9/5038 718/103 |
| 2016/0140831 | A1* | 5/2016 | Hermann | G08B 21/245 340/573.1 |
| 2016/0342694 | A1* | 11/2016 | Allen | H04L 67/10 |
| 2017/0270433 | A1* | 9/2017 | Tsubouchi | G06N 20/00 |
| 2020/0294651 | A1* | 9/2020 | Akitomi | A61B 5/165 |
| 2021/0056491 | A1* | 2/2021 | Saito | G06Q 10/063116 |

FOREIGN PATENT DOCUMENTS

| JP | 2012-199890 A | 10/2012 |
| JP | 2016-533110 A | 10/2016 |
| JP | 2017-176250 A | 10/2017 |

* cited by examiner

| LAST PERFORMANCE DATE | STATUS DATA SET | | |
|---|---|---|---|
| | DEVICE ANGLE (HORIZONTAL) | DAY OF WEEK | TIME |
| 2018/01/01 | 45 DEGREE | MONDAY | 10:00 |
| ⋮ | ⋮ | ⋮ | ⋮ |

| NOTIFICATION CANDIDATE No | STATUS DATA SET | | | FREQUENCY |
|---|---|---|---|---|
| | DEVICE ANGLE (HORIZONTAL) | DAY OF WEEK | TIME | |
| 1 | 45 DEGREE | MONDAY | 10:00 | MEDIUM |
| 2 | 30 DEGREE | SUNDAY | 11:00 | HIGH |
| ⋮ | ⋮ | ⋮ | ⋮ | ⋮ |

CONTINUAL ENGAGEMENT SUPPORT DEVICE, PORTABLE TERMINAL, CONTINUAL ENGAGEMENT SUPPORT METHOD, AND PROGRAM

This application is a National Stage Entry of PCT/JP2019/025399 filed on Jun. 26, 2019, which claims priority from Japanese Patent Application 2018-165203 filed on Sep. 4, 2018, the contents of all of which are incorporated herein by reference, in their entirety.

TECHNICAL FIELD

This invention relates to a continual engagement support device, a portable terminal, a continual engagement support method, and a continual engagement support program for continuously having a user perform a predetermined action performed via a portable terminal.

BACKGROUND ART

Recording data about one's sleep on a daily basis is known to be effective in improving one's sleep habits. Tools to aid in daily recording include, for example, a sleep diary, etc. Moreover, applications have also been developed that provide sleep diary functions on portable terminals such as smartphones and smartwatches.

However, even with using the convenient interface provided by the portable terminal application, it is difficult to keep the record in the sleep diary, and how to keep the record is a major challenge.

In relation to the task of having a user continuously perform a predetermined action performed via a portable terminal, not limited to recording sleep, for example, there are methods described in the Patent Literatures 1 and 2. The method described in the Patent Literature 1 prepares a configuration interface that receives event notifications from other applications instead of the user spontaneously managing a schedule. Then, when the user receives a notification including an event content and occurrence time via the configuration interface, the user automatically sets a reminder schedule on the basis of the event content and occurrence time.

Moreover, the method described in the Patent Literature 2 detects that the user has taken a specific action related to the device in the portable terminal device, and determines whether to generate the reminder on the basis of the information on the application launch performance within a predetermined time from the time of the past reminder generation. The Patent Literature 2 includes examples of specific actions, such as opening and closing operation the enclosure more than a predetermined number of times or more than a predetermined number of times within a predetermined time, and a number of steps more than a predetermined value within a predetermined time.

CITATION LIST

Patent Literature

Patent Literature 1: Japanese National Publication of International Patent Application No. 2016-533110

Patent Literature 2: Japanese Patent Application Laid-Open No. 2006-350519

SUMMARY OF INVENTION

Technical Problem

However, the methods described in the Patent Literatures 1 and 2 are not expected to be effective in cases where the time to perform an action to be wanted to continue is not predetermined, such as in the case of recording sleep, or where it is difficult to find a specific action of the user associated with the action.

In general, there is variation in an individual's daily time to fall asleep and time to wake up. In addition, these often vary depending on the season and day of the week. Therefore, for example, even if the method described in Patent Literature 1 is used to prompt the recording of sleep via a predetermined application on a portable terminal before falling asleep or after waking up on a daily basis, there remains the challenge of how to generate an event notification message that includes the appropriate time of occurrence.

In addition, the method described in Patent Literature 2 assumes that there is a correlation (mainly, a co-occurrence relationship) between a predetermined action that is to be wanted to continue and the opening/closing operation of the enclosure by the user or the walking of the user itself. However, as in the case of a sleep record, not only the timing of a predetermined action varies greatly depending on users, but also there is no guarantee that each user will perform a predetermined action (opening/closing operation of the enclosure or walking) at the time of performing the action. Patent Literature 2 does not take into account any countermeasures for such cases.

The situation described above is not limited to sleep recording, but is likely to occur in an action that, for example, the timing of the action and actions performed at the same time as the action are highly user-dependent, and it is difficult to measure the timing at which the action would be performed using only predetermined time and action criteria, in the same way.

Therefore, it is an object of the present invention to provide a continual engagement support device, a portable terminal, a continual engagement support method, and a continual engagement support program that enables a user to continuously perform a predetermined action, even if such an action is performed.

Solution to Problem

A continual engagement support device according to the present invention includes: a performance data storage means which stores performance data including time data indicating the time of performance and sensor data of the time of performance or the surrounding time obtained from the sensors mounted on the portable terminal when the target action is performed via the portable terminal possessed by the target user; a timing detection means which detects the performance timing, which is the timing at which the target user is likely to perform the target action during the predetermined cycle, on the basis of the performance data; and a notification means which provides a notification to prompt the performance of the target action at the detected performance timing when the target action is not performed for a predetermined period of time or longer.

A portable terminal according to the present invention includes: a sensor which measures predetermined data indicating the situation of the terminal to be installed or its surroundings; a sensor data storage means which stores sensor data which is the predetermined data obtained from the sensor for a certain period of time; a performance data acquisition means which acquires time data indicating the time of performance and sensor data of the time of performance or the surrounding time, as performance data, when the predetermined target action is performed; a performance data storage means which stores the performance data; a timing detection means which detects the performance timing, which is the timing at which the target user is likely to perform the target action during the predetermined cycle, on the basis of the performance data stored in the performance data storage means; and a notification means which provides a notification to prompt the performance of the target action at the detected performance timing detected by the timing detection means when the target action is not performed for a predetermined period of time or longer.

In a continual engagement support method according to the present invention, an information processing device: stores performance data including time data indicating the time of performance and sensor data of the time of performance or the surrounding time obtained from the sensors mounted on the portable terminal when the target action is performed via the portable terminal possessed by the target user, in a predetermined storage device; detects the performance timing, which is the timing at which the target user is likely to perform the target action during the predetermined cycle, on the basis of the performance data; and provides a notification to prompt the performance of the target action at the detected performance timing when the target action is not performed for a predetermined period of time or longer.

A continual engagement support program according to the present invention causes a computer to execute: a process of storing performance data including time data indicating the time of performance and sensor data of the time of performance or the surrounding time obtained from the sensors mounted on the portable terminal when the target action is performed via the portable terminal possessed by the target user, in a predetermined storage device; a process of detecting the performance timing, which is the timing at which the target user is likely to perform the target action during the predetermined cycle, on the basis of the performance data; and a process of providing a notification to prompt the performance of the target action at the detected performance timing when the target action is not performed for a predetermined period of time or longer.

Advantageous Effects of Invention

According to the present invention, it is possible to have the user continue to perform a predetermined action.

DESCRIPTION OF EMBODIMENTS

Exemplary embodiments of the present invention are described below with reference to the drawings. First, the technical concept of the present invention will be briefly described.

In order to make a person continuously perform a predetermined action, it is effective to make the action become a habit of the person. One way to make the action a habit is to incorporate the action to be wanted to be a habit, into the person's rhythm of life, and then to repeatedly perform the action adjusting at a certain timing in a certain activity cycle which the target user has originally, called the rhythm of life.

In order to support such habituation, the present invention firstly finds a timing in the rhythm of life that is easy for the target user to perform the target action, so that the user can repeatedly perform an action (hereinafter referred to as "target action") set to object without difficulty in the rhythm of life. If the target action has not been performed, the present invention notifies the user of prompting to perform the target action at the timing.

As a method for finding such a timing, information (sensor data) obtained from sensors installed in the portable terminal that performs the target action is used. More specifically, sensor data at a time when the target action was performed in the past or at a surrounding time is collected and the action is associated with the portable terminal indicated by the collected sensor data or the situation of its surroundings (e.g., position, movement, tilt, direction, operation content, ambient brightness, etc. of the device). As a method of association, for example, a discriminant model may be constructed by learning a relationship between the situation indicated by the accumulated data and the target action by machine learning or the like to determine whether the situation is a good timing for the user to perform the target action for any given situation.

Figure 1:
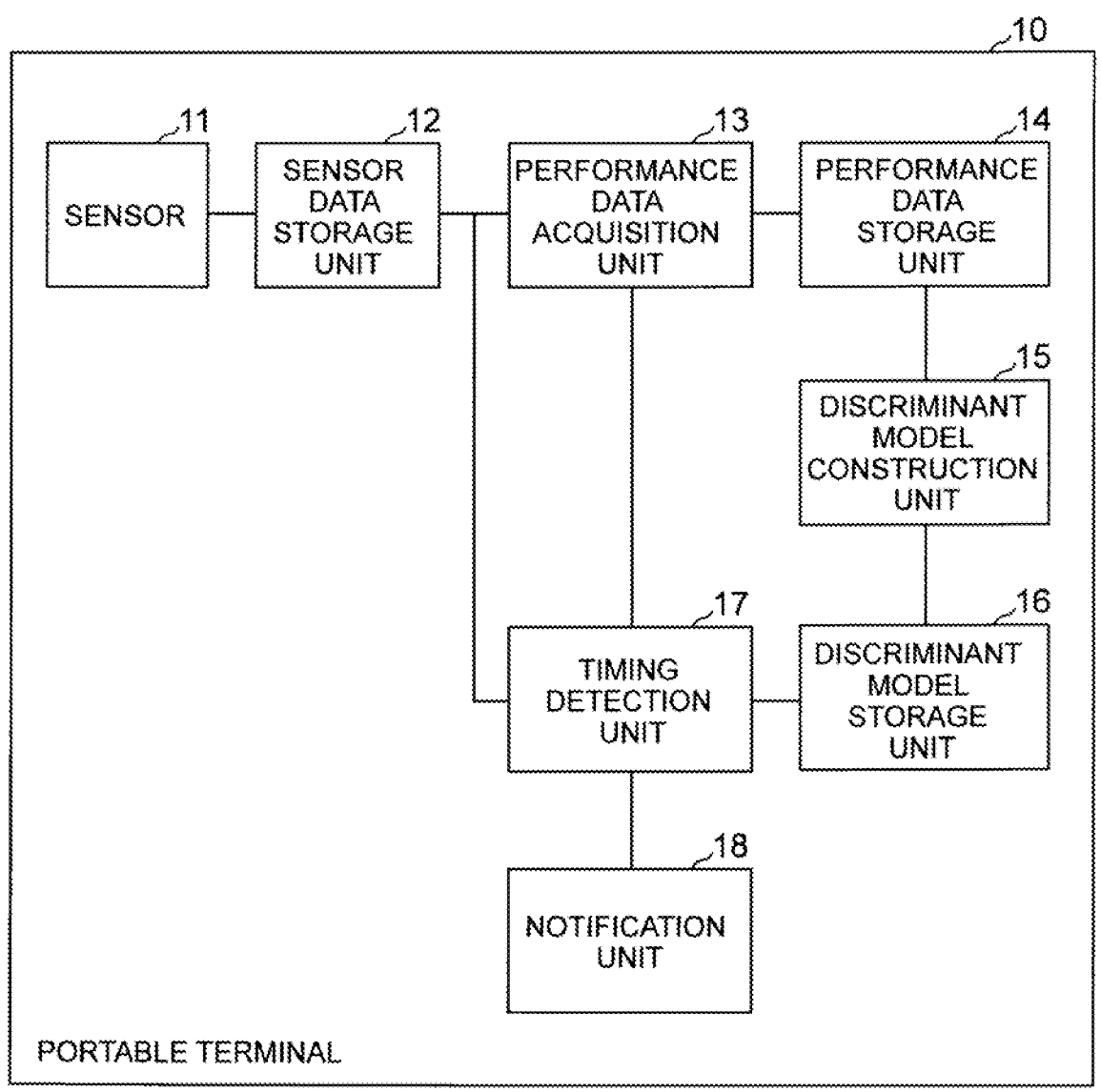
FIG. 1 is a configuration diagram showing an example of a portable terminal of the first exemplary embodiment.

FIG. 1 is a configuration diagram showing an example of the portable terminal 10 of the first exemplary embodiment. The portable terminal 10 shown in FIG. 1 has a sensor 11, a sensor data storage unit 12, a performance data acquisition unit 13, a performance data storage unit 14, a discriminant model construction unit 15, a discriminant model storage unit 16, a timing detection unit 17, and a notification unit 18.

The sensors 11 measure a predetermined data indicating a situation of the portable terminal 10 or its surroundings. Although FIG. 1 shows an example that the portable terminal 10 has a single sensor 11, the sensor 11 may be plural. The sensor 11 may be, for example, an accelerometer or gyroscope that measures data indicating the tilt of the portable terminal 10.

The sensor data storage unit 12 stores time series data of sensor data including sensor values obtained from the sensor 11. By storing sensor data over a certain period of time, the sensor data storage unit 12 can know not only the situation at the time of the occurrence of the target action, but also the situation at the surrounding time (e.g., how the portable terminal was operated and how long it was operated).

The performance data acquisition unit 13 detects that the target action is performed by acquiring event information or the like indicating the performance of the target operation by the user or the like, and causes that gist to be stored in the performance data storage unit 14 as performance data together with time data indicating the time of occurrence of the target action and sensor data that can be collected at that time. The performance data acquisition unit 13 may, for example, read a certain amount of time-series data of the sensor data stored in the sensor data storage unit 12 each time the user performs the target action, and generate and store the performance data. The performance data may include data other than the time data and the sensor data. The performance data includes at least the data to be input to the discriminant model described below.

The performance data storage unit 14 stores the performance data.

The discriminant model construction unit 15 constructs (learns) a discriminant model using the performance data stored in the performance data storage unit 14. The discriminant model constructed by the discriminant model construction unit 15 may, for example, be a discriminant model that outputs a discriminant result of whether the target action is likely to be executed at the timing for the input data including time data indicating a date and time to be wanted to be judged and sensor data for a certain period of time in the vicinity thereof. Note, the input data to the discriminant model is not limited to the above. As an example, one of situation data showing various situations that can be acquired by the portable terminal 10, such as data of a time and day of the week when the target action was performed by the user in the past, sensor data such as an accelerometer and a gyroscope for a predetermined time prior to the time when the target action was performed, schedule data for a time before and after the time when the target action was performed, etc. or a combination thereof may be used as input data.

The discriminant model storage unit 16 stores the discriminant model constructed by the discriminant model construction unit 15.

The timing detection unit 17 detects a timing at which it is easy for the user to perform the target action (hereinafter referred to as "performance timing") using the discriminant model stored in the discriminant model storage unit 16. For example, the timing detection unit 17 acquires, at a predetermined timing, time data indicating a current date, time, day of the week, or the like as the time at which a decision is to be wanted to be made, and sensor data of the surrounding time (e.g., for a certain amount of time in the past). The timing detection unit 17 may detect the performance timing by inputting those status data acquired into the discriminant model to discriminate whether the present is the performance timing or not. Although the timing of performing the discrimination is not particularly limited, it may be, for example, when a predetermined condition such as a certain period of time or around a time when the target action was performed in the past is satisfied, or the like.

In addition, instead of determining whether the present time is the performance timing using the current situation data (e.g., time data and sensor data, etc.), the timing detection unit 17 may identify the situation data to be detected in such performance timing in advance as follows. For example, the timing detection unit 17 identifies what situation (day of the week, time of day, and characteristics of the sensor data) is likely to cause the target action to be performed on the basis of the relationship (strength of correlation) between whether the target action is performed and the input data, etc., obtained from the learned discriminant model. The timing detection unit 17 may store a pattern of situation data (such as time data and sensor data) indicating the identified situation in the memory unit (not shown) as a situation data pattern of the candidate for the performance timing. At this time, the timing detection unit 17 may store the notification results of the candidate (such as subsequent performance or not, scoring results, etc.), or information on the notification frequency, etc., together with the situation data pattern of the candidate for the performance timing. Thereafter, the candidate performance timing is used as the notification timing.

Note, the timing detection unit 17 may identify what situations (day of the week, time of day, and characteristics of the sensor data) are likely to cause the target action to be performed directly on the basis of the performance data stored in the performance data storage unit 14, without using the learned discriminant model. In that case, the discriminant model construction unit 15 and the discriminant model storage unit 16 can be omitted.

The notification unit 18 notifies the user to prompt to perform the target action when the current action status of the user meets a predetermined notification condition, such as when the target action has not been performed for a certain period of time. The notification unit 18 of the present exemplary embodiment makes the notification at the performance timing or a candidate timing thereof, which is detected by the timing detection unit 17. Note, in the case where a plurality of the timings exist in a single cycle, the notification unit 18 may notify in general, i.e., each time the timing is detected, until the user shows a response.

In addition, the notification unit 18 may score the notification after the notification, and may set a priority for the timing at which the notification is made, such as by reducing the frequency of subsequent notifications for the timing at which the notification was made with a poor scoring result (or the situation data pattern associated to the timing). For example, the scoring may be performed on the basis of a time lag from the notification to the actual performance of the target action.

Figure 2:
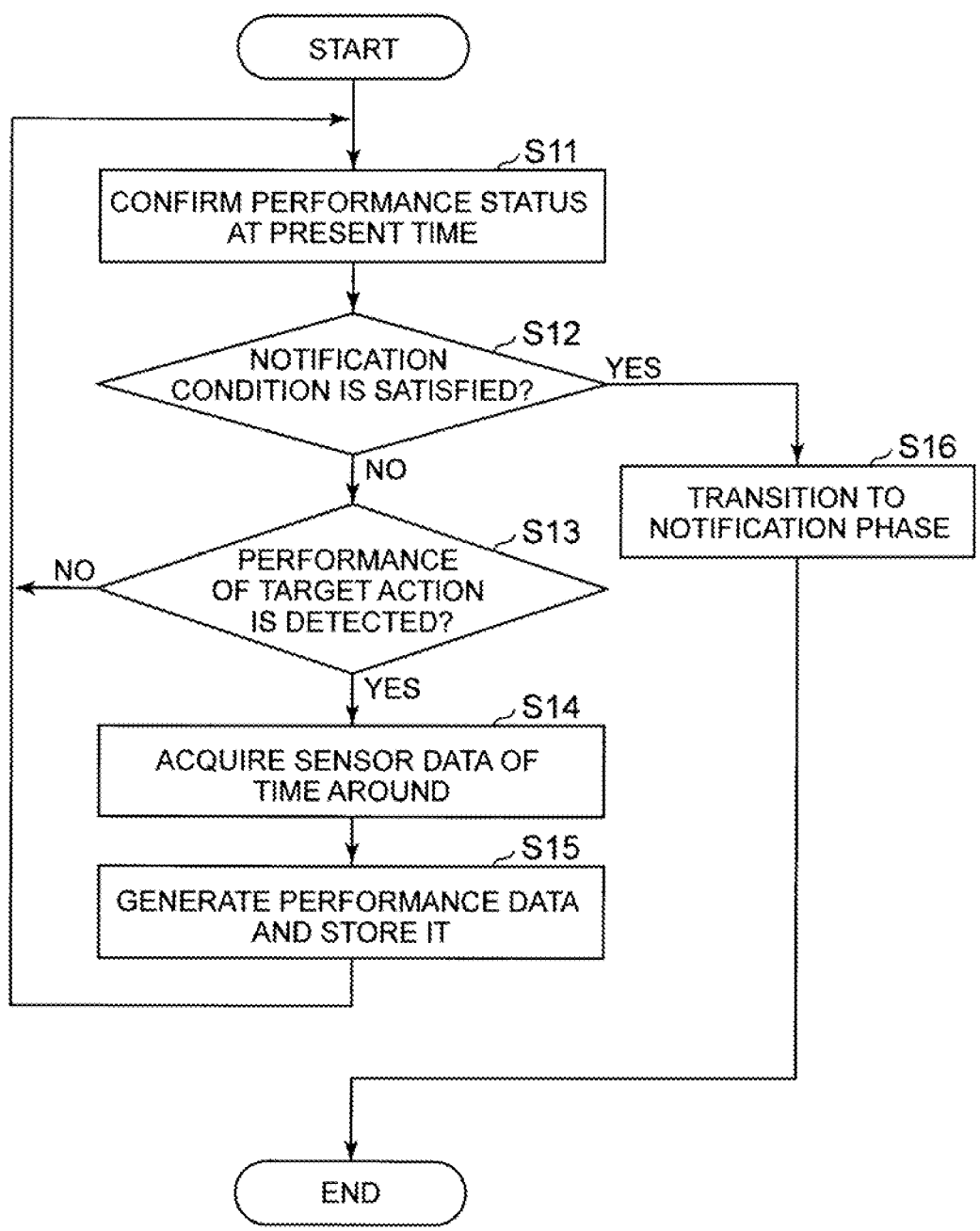
FIG. 2 is a flowchart showing an example of the operation of the portable terminal of the first exemplary embodiment.
Figure 3:
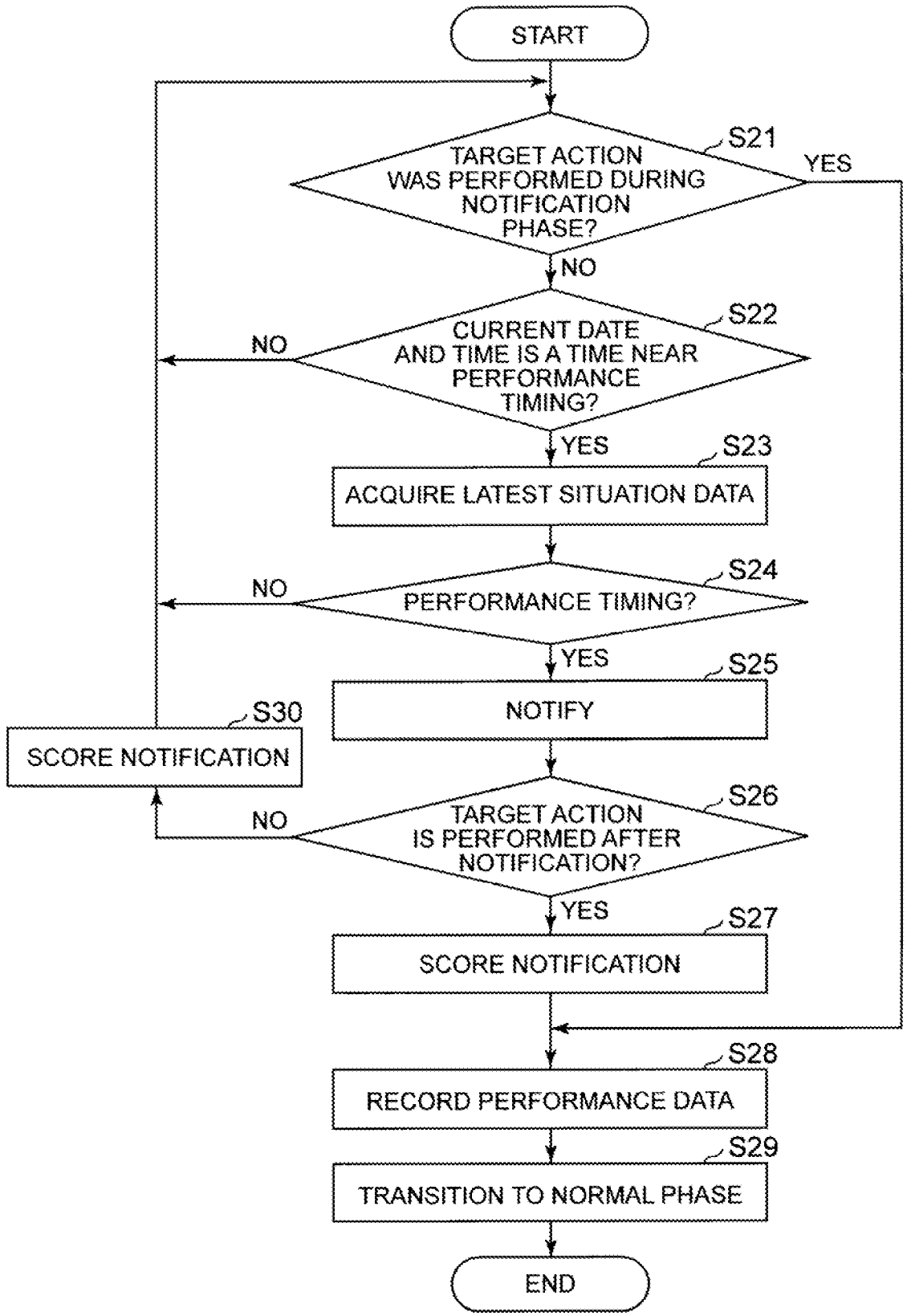
FIG. 3 is a flowchart showing an example of the operation of the portable terminal of the first exemplary embodiment.

Next, the operation of the present exemplary embodiment will be described. FIGS. 2 and 3 are flowcharts showing an example of the operation of the portable terminal 10 of the present exemplary embodiment. The portable terminal 10 of the present exemplary embodiment has two phases: a normal phase in which the target action is being performed smoothly and a notification phase in which the target action is not being performed smoothly. Note, the normal phase includes a collection phase of performance data. The transition from the normal phase to the notification phase may be performed when a predetermined notification condition is met, for example, when the target action has not been performed for n consecutive cycles, or the like. In addition, the transition from the notification phase to the normal phase is performed when the target action has been performed. The portable terminal 10 may be equipped with a switching unit that detects whether the target action is performed at each predetermined cycle to switch such a phase. Note, in the example shown in FIG. 1, the performance data acquisition unit 13 is assumed to play the role of the above switching unit.

First, referring to FIG. 2, an example of the operation of the portable terminal 10 in the normal phase of the present exemplary embodiment will be described. Although not shown in the figure, it is assumed that the sensor data storage unit 12 always stores time series data of sensor data for the most recent fixed period of time independent of the present operation.

In the example shown in FIG. 2, the performance data acquisition unit 13 first confirms the performance status (e.g., the last performance date, etc.) of the target action at the present time (step S11). The performance data acquisition unit 13 may, for example, check the performance status of the target action at the present time by referring to the performance data stored in the performance data storage unit 14. Note, the timing detection unit 17 may access the performance data storage unit 14 to check the performance status of the target action at the present time.

Next, the timing detection unit 17 determines whether the performance status of the target action at present time meets the notification condition, and if the condition is satisfied, it proceeds to step S16 (Yes in step S12). On the other hand, if the condition is not satisfied, it proceeds to step S13 (No in step S12). An example of the notification condition is that more than a predetermined time has passed since the last performance date, for example.

In step S13, the performance data acquisition unit 13 monitors the performance of the target action by the user. The monitoring of the performance of the target action may be performed, for example, by waiting for the receipt of an event notification indicating the performance of the target action.

When the performance of the target action is detected (Yes in step S13), the performance data acquisition unit 13 acquires the situation data including the sensor data of the time around the time of occurrence, generates the performance data and stores it in the performance data storage unit 14 (step S14, step S15).

In the above series of operations, for example, the portable terminal 10 may start in normal mode when the user first launches the target application and wait until the user performs the target action for the application. The performance data acquisition unit 13 then saves the performance data when the user performs the target action. The portable terminal 10 may then start monitoring the last performance day and may stand by directly if a predetermined time (e.g., two days) has not passed from the last performance day. In the meantime, if the predetermined action has been performed, the performance data acquisition unit 13 stores the implementation data. On the other hand, the portable terminal 10 may transition to the notification phase when a predetermined time or more has elapsed from the last performance date. Note, the period of time to transition to the notification phase is not particularly limited. For example, it may be a period of time equivalent to one cycle in which the target action is performed (e.g., one day if it is a one-day cycle, etc.).

Although the figure is omitted, when a certain amount of performance data is stored in the performance data storage unit 14, the discriminant model construction unit 15 constructs a discriminant model using the stored data and stores it in the discriminant model storage unit 16. In addition, the timing detection unit 17 identifies a pattern of situational data that occurs at a timing that is a candidate for the performance timing on the basis of the performance data or the discriminant model stored in the discriminant model storage unit 16.

Next, referring to FIG. 3, an example of operation in the notification phase of the portable terminal 10 of the present exemplary embodiment will be described. Although the figure is omitted, independent of the present operation, it is assumed that the sensor data storage unit 12 always stores the time series data of the sensor data for the latest fixed period of time. In addition, in this example, it is assumed that a pattern of situation data that occurs at the timing that is a candidate for the performance timing is specified in advance and information about the pattern is stored.

In the example shown in FIG. 3, the timing detection unit 17 first checks whether the target action was performed during the notification phase (step S21).

If the target action was performed (Yes in step S21), it proceeds to step S28.

If the target action was not performed (No in step S21), the timing detection unit 17 confirms whether the current date and time is near the time of the performance timing (step S22).

In step S22, whether the current date and time is a time near the performance timing may be determined on the basis of the time data included in the information of the pattern of the situation data stored as information of the candidate for the performance timing, for example. For example, the timing detection unit 17 may determine that the time is in the vicinity of the performance timing when the current time is a time within a predetermined range before or after the time stored as information of the candidate for the performance timing in the cycle to be determined.

If the current date and time is not in the vicinity of the performance timing (No in step S22), the timing detection unit 17 returns to step S21 and confirms the performance of the target action until the time near the performance timing is entered.

On the other hand, if the current date and time is a time near the performance timing (Yes in step S22), the timing detection unit 17 acquires the latest situation data and determines whether the latest situation indicated by the acquired situation data is the performance timing (step S23, step S24). The timing detection unit 17 may acquire, for example, time data indicating the current date and time and sensor data stored in the sensor data storage unit 12 as the latest situation data.

The determination of whether it is a performance timing may be made on the basis of sensor data included in the information of the pattern of situation data that is stored in advance as information of the candidate for the performance timing, for example. For example, the timing detection unit 17 may determine that the timing is a performance timing when the latest sensor data matches or is similar to the sensor data included in the information of the pattern of situation data that is information of the candidate for the performance timing.

If the timing detection unit 17 determines that the timing is not the performance timing (No in step S24), the timing detection unit 17 returns to step S21 and, while confirming the performance of the target action, determines the performance timing on the basis of the latest status data during the time near the performance timing.

On the other hand, if the timing detection unit 17 determines that the timing is the performance timing (Yes in step S24), the timing detection unit 17 gives a notification to the user to prompt to perform the target action (step S25). At this time, the timing detection unit 17 may adjust the notification frequency by referring to the scoring results of the past notifications at the performance timing. For example, the timing detection unit 17 may reduce the notification frequency when the scoring results are poor even if the current situation is at the performance timing. Note, notification method is not particularly limited.

After notification, it is checked whether the target action is performed until a predetermined time has elapsed (step S26). Whether the target action is performed can be confirmed in the same way as in step S21. At this time, if the target action is performed until the predetermined time has elapsed (Yes in step S26), the notification unit 18 scores the notification according to the time (elapsed time) taken from the notification to the performance (step S27). Thereafter, it proceeds to step S28.

On the other hand, if the target action is not performed until the predetermined time has elapsed after the notification (No in step S26), the notification unit 18 scores the notification worse than when the target action had been performed (step S30).

In step S28, upon performance of the target action, the performance data acquisition unit 13 acquires the situation data including the sensor data of the time around the time of occurrence, generates the performance data and stores it in the performance data storage unit 14. Note, instead of the performance data acquisition unit 13, the timing detection unit 17 may record the performance data in the notification phase.

Finally, it transitions to the normal phase (step S29).

Figures 4, 5, 6:
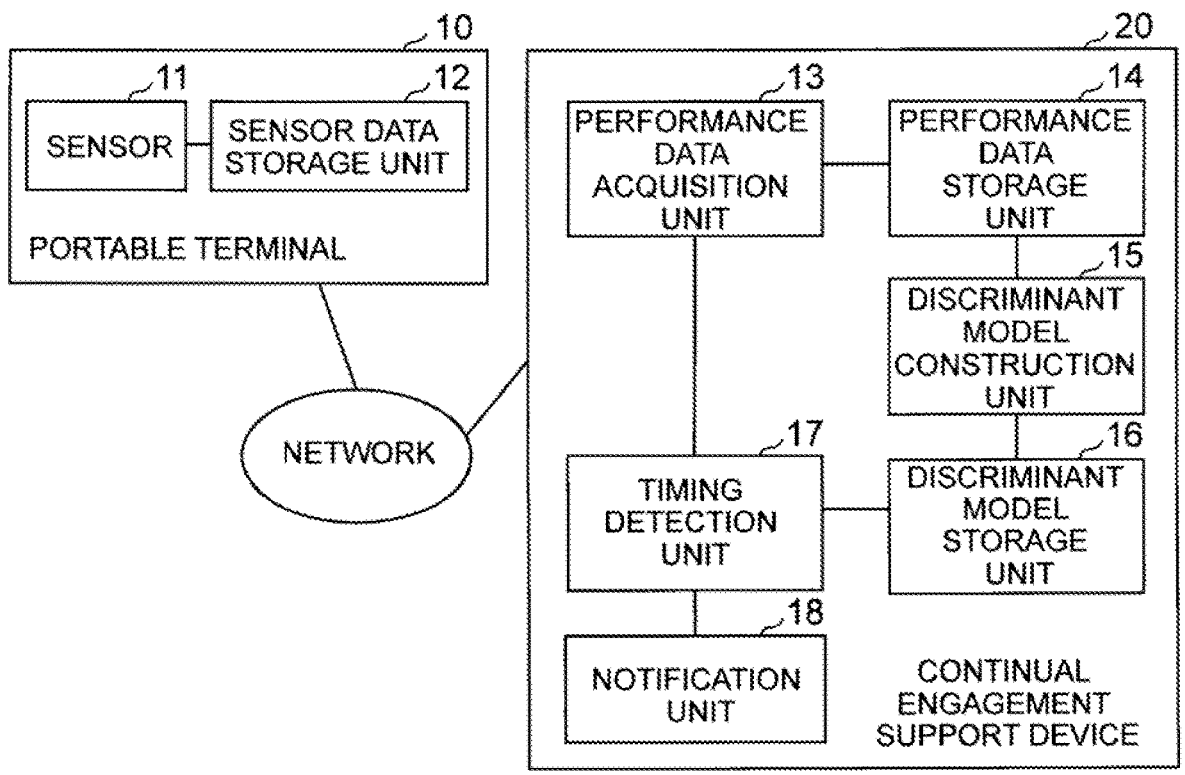
FIG. 4 is an explanatory diagram showing of an example of performance data.
FIG. 5 is an explanatory diagram showing of an example of a performance timing candidate list.
FIG. 6 is a block diagram showing an example of a continual engagement support system.

FIG. 4 is an explanatory diagram showing of an example of the performance data. The performance data acquisition unit 13 may generate and store the performance data shown in FIG. 4, for example, when the user has performed the target action. The performance data shown in FIG. 4 includes the last performance date and the status data set. In addition, the situation data set includes the device angle as sensor data and the day of the week and time as time data. The device angle may be a device angle immediately before performing the target action or immediately before launching the application that performs the target action (more specifically, a horizontal angle of the device acquired using a gyroscope or the like). Note, in this example, as the sensor data in the situation data set, the data including only the device angle immediately before performing the target action or immediately before launching the application that performs the target action is shown, but it can also include the device angle for a certain period of time in the past from the time which the target action was performed, i.e. the time series data of the device angle. By including such time series data, it is possible to associate the transitions of the device angle when the target action is performed as a feature of the performance timing said to be notification timing or its candidate.

In addition, FIG. 5 is an explanatory diagram showing of an example of a performance timing candidate list. When the performance data was accumulated more than a predetermined amount, the timing detection unit 17 may generate and store a candidate list of performance timings as shown in FIG. 5, for example, on the basis of the accumulated performance data. The candidate list shown in FIG. 5 includes a number, a status data set, and a notification frequency for each candidate performance timing. Note, the situation data set is the same as the situation data set in the performance data.

Next, a more specific example of operation will be described. For example, the portable terminal 10 starts the operation as described above from the normal phase upon launching an application that performs at least a continual support program to make the CPU or the like perform the operation described above. First, in the normal phase after launching, the application waits until the user performs the target action.

When the user has performed the target action, the performance data storage unit 14 stores the performance data including, for example, the last performance date and the status data set as described above.

Next, the application monitors the last performance date of the performance data stored in the performance data storage unit 14, and if it is within a predetermined time (e.g., two days) from the last performance date, waits until the next target action is performed by the user. In the meantime, if the target action is performed, the performance data storage unit 14 performs the same storage process of the performance data as above described.

If the performance of the target action by the user is delayed and the elapsed time since the last performance date exceeds a predetermined time, it is transferred to the notification phase.

In the notification phase, the application first reads the performance data stored in the performance data storage unit 14 and information about the candidate of performance timing generated in the past, if any. The discriminant model construction unit 15 uses the read information to generate a candidate list for the latest performance timing.

After creating the candidate list, the application monitors the status of the terminal, such as the device angle, by acquiring sensor data while the current date and time is within a predetermined range of times before and after the time indicated by one of the candidates for each performance timing (e.g., before and after the time of occurrence, between m minutes, etc.).

During monitoring, when the state of the terminal matches the state indicated by the candidate list (more specifically, the state indicated by the sensor data included in the status data set of the candidate included in the time period), the application provides a notification to the user that prompts the user to perform the predetermined action.

When the state of the terminal does not match the state indicated by the candidate list and exceeds the candidate time period for the performance timing, the timing detection unit 17 waits until it enters the time period that is said to be near the performance timing of the other candidates (monitoring of the time).

In addition, after the notification, the application monitors the performance of the predetermined action by the user who received the notification, measures the elapsed time from the notification to the performance, and scores the notification. Then, the notification unit 18 updates the notification frequency of the candidate that is the source of the notification in the candidate list on the basis of the scoring. The updating of the notification frequency may, for example, increase the notification frequency by one level from "medium" to "high" if it is within one hour from the notification to performance, and decrease the notification frequency by one level from "medium" to "low" if it exceeds one hour (including non-performance), or the like. Note, if the user does not perform the predetermined action even after receiving the notification, the timing detection unit 17 lowers the notification frequency and waits until the it enters a time period that is said to be in the vicinity of the performance timing of the other candidates.

If a predetermined action is performed at any timing, the application ends the notification phase and transitions to the normal phase.

Note, in the above example, the status (sensor data) of the terminal is monitored only in the time period around the candidate performance timing and notification is made on the basis of the results of the monitoring. However, the timing detection unit 17 can also detect and notify the performance timing without setting a time period. As an example, the discriminant model construction unit 15 may input a situation data set including time data and sensor data into the discriminant model at regular intervals, obtain a discriminant result of whether the timing is performance timing as an output, and the notification unit 18 may make a notification on the basis of the discriminant result.

As described above, according to the present exemplary embodiment, the discriminant model construction unit 15 learns the target action to be wanted to be continuously performed, together with the situation data of the surrounding time as well as the time data of the past performance. The timing detection unit 17 finds a timing that is easy to perform. The notification unit 18 uses the timing to notify the user to prompt to perform the target action when it has not been performed. As a result, the portable terminal 10 of the present exemplary embodiment can make the target action a habit at a timing that is easy perform for a user during a predetermined cycle in which the user wants to continue the target action.

Note, the habituation according to the present exemplary embodiment does not necessarily force the user to perform the action at the same time. Habituation according to the present exemplary embodiment refers to incorporating the action in a series of operations that is easy for the user to perform the action by notifying the user at a timing when the user can easily perform the action on the basis of the user's operation habits and the like. In this way, the notification is made at a timing when it is physically or psychologically less load for the user to perform the action, to help the user get into the habit of performing the action. As a result, it is possible to make the user continuously perform the desired action.

In addition, in the above exemplary embodiment, the example of performing all of the above-described actions on the portable terminal operated by the user is shown. However, it is also possible, for example, to perform some of the above-described actions (e.g., building a model, identifying a pattern of situation data as a candidate for performance timing, etc.) by the portable terminal and a predetermined server connected thereto in cooperation. As an example, as shown in FIG. 6, the portable terminal 10 equipped with the sensor 11 and the sensor data storage unit 12 and the continual engagement support device 20 equipped with other processing units are included, and the continual engagement support device 20 can also perform actions of the processing units other than the sensor 11 and the sensor data storage unit 12. FIG. 6 is a block diagram showing a configuration example of the continual engagement support system.

Figure 7:
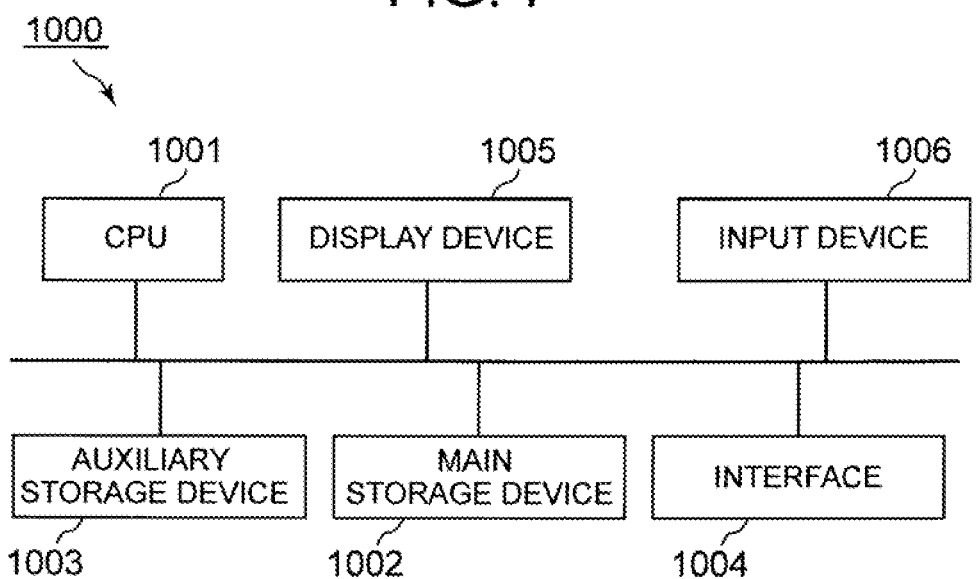
FIG. 7 is a schematic block diagram showing an example of configuration of a computer according to each embodiment of the present invention.

FIG. 7 is a schematic block diagram showing an example of configuration of a computer according to each embodiment of the present invention. A computer 1000 includes a CPU 1001, a main storage device 1002, an auxiliary storage device 1003, an interface 1004, a display device 1005, and an input device 1006.

Terminals and other devices such as servers equipped with the above exemplary embodiments may be performed in the computer 1000. In this case, operation of each device may be stored in the auxiliary storage device 1003 in a form of a program. The CPU 1001 reads out a program from the auxiliary storage device 1003, expands the program in the main storage device 1002, and executes a predetermined process in each exemplary embodiment according to the program. Note that the CPU 1001 is an example of an information processing device that operates according to a program, and may include, in addition to a central processing unit (CPU), for example, a micro processing unit (MPU), a memory control unit (MCU), or graphics processing unit (GPU).

The auxiliary storage device 1003 is an example of a non-transitory tangible medium. Other examples of the non-transitory tangible medium include a magnetic disk, a magneto-optical disk, a CD-ROM, a DVD-ROM, and a semiconductor memory, connected via the interface 1004. In addition, in a case where this program is distributed to the computer 1000 via a communication line, the computer 1000 to which the program is distributed may expand a program in the main storage device 1002 and execute a predetermined process in each exemplary embodiment.

In addition, the program may be for implementing a part of a predetermined process in each exemplary embodiment. Furthermore, the program may be a difference program that implements a predetermined process in each exemplary embodiment in combination with another program already stored in the auxiliary storage device 1003.

The interface 1004 transmits/receives information to/from another device. In addition, the display device 1005 also presents information to a user. In addition, the input device 1006 receives input of information from a user.

In addition, depending on the processing contents in the exemplary embodiment, some elements of the computer 1000 can be omitted. For example, if the computer 1000 does not present information to a user, the display device 1005 can be omitted. For example, if the computer 1000 does not receive information input from a user, the input device 1006 can be omitted.

In addition, some or all of the above components of each exemplary embodiment are performed by a general-purpose or dedicated circuitry, a processor, or a combination thereof. These components may be constituted by a single chip or a plurality of chips connected to each other via a bus. In addition, some or all of the above components of each exemplary embodiment may be achieved by a combination of the above-described circuitry and the like and a program.

In a case where some or all of the above components of each exemplary embodiment are achieved by a plurality of information processing devices, circuitries, and the like, the plurality of information processing devices, circuitries, and the like may be arranged in a concentrated manner or a distributed manner. For example, the information processing device, the circuitry, and the like may be achieved as a form in which a client and server system, a cloud computing system, and the like are connected to each other via a communication network.

Figure 8:
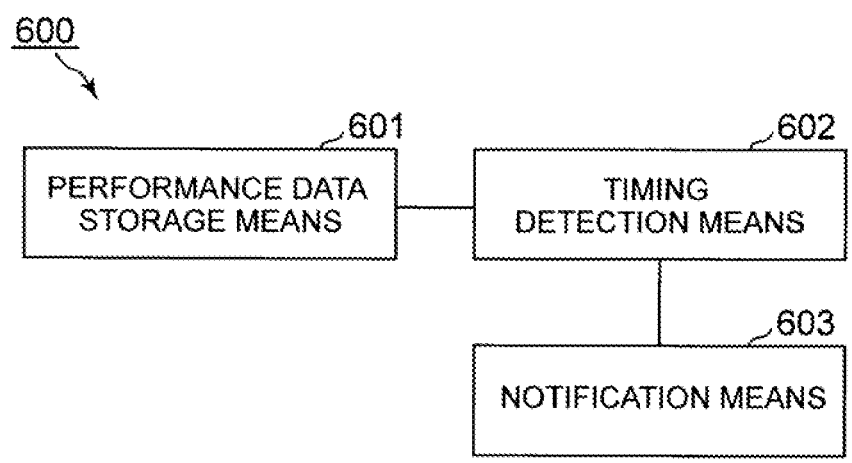
FIG. 8 is a block diagram showing an overview of the continual engagement support device of the present invention.

Next, an overview of the present invention will be described. FIG. 8 is a block diagram showing an overview of the continual engagement support device of the present invention. The continual engagement support device 600 shown in FIG. 8 is provided with performance data storage means 601, timing detection means 602, and notification means 603.

The performance data storage means 601 (for example, the performance data storage unit 14) stores performance data including time data indicating the time of performance and sensor data of the time of performance or the surrounding time obtained from the sensors mounted on the portable terminal when the target action is performed via the portable terminal possessed by the target user.

The timing detection means 602 (for example, the timing detection unit 17) detects the performance timing, which is the timing at which the target user is likely to perform the target action during the predetermined cycle, on the basis of the performance data.

The notification means 603 (for example, the notification unit 18) provides a notification to prompt the performance of the target action at the detected performance timing when the target action is not performed for a predetermined period of time or longer.

This configuration allows users to continuously perform actions even when the timing of the action and actions performed at the same time as the action are highly user-dependent, and it is difficult to measure the timing at which the action would be performed using only predetermined time and action criteria.

Hereinabove, the invention of the present application has been described with reference to the present exemplary embodiment and examples, but the present invention is not limited to the above exemplary embodiment and examples. Various modifications that can be understood by a person skilled in the art can be made to the configuration and details of the invention of the present application within the scope of the invention of the present application.

This application claims a priority based on Japanese Patent Application No. 2018-165203 that was filed on Sep. 4, 2018, and incorporates the entire disclosure thereof herein.

INDUSTRIAL APPLICABILITY

The present invention is suitably applicable to applications that want to continue the operation performed via a portable terminal.

REFERENCE SIGNS LIST

10 Portable terminal
11 Sensor
12 Sensor data storage unit
13 Performance data acquisition unit
14 Performance data storage unit
15 Discriminant model construction unit
16 Discriminant model storage unit
17 Timing detection unit
18 Notification unit
20, 600 Continual engagement support device
601 Performance data storage means
602 Timing detection means
603 Notification means
1000 Computer
1001 CPU
1002 Main storage device
1003 Auxiliary storage device
1004 Interface
1005 Display device
1006 Input device

What is claimed is:

1. A continual engagement support device comprising:
a performance data storage unit which stores performance data including time data indicating a time of performance and sensor data of the time of performance or a surrounding time obtained from sensors mounted on a portable terminal when a target action is performed via the portable terminal possessed by a target user;
a timing detection unit which detects performance timing at which the target user is likely to perform the target action during a predetermined cycle, based on the performance data;
a notification unit which provides a notification to prompt performance of the target action at the detected performance timing when the target action is not performed for a predetermined period of time or longer; and
a switching unit which switches between a notification phase where the notification is made and a normal phase where the notification is not made,
wherein the switching unit detects whether the target action is performed for each of a plurality of cycles and switches from the normal phase to the notification phase when the target action is not performed for a predetermined number of consecutive cycles, and
the notification unit provides the notification to prompt the performance of the target action at the performance timing detected by the timing detection unit only during the notification phase.

2. The continual engagement support device according to claim 1, wherein
the time of performance includes a date, a day of a week, and a time.

3. The continual engagement support device according to claim 1, wherein
the timing detection unit detects the performance timing by identifying, based on the performance data, at least a time period of the performance timing or a candidate timing and a pattern of the sensor data that occurs in the performance timing or the candidate timing, and monitors occurrence of a pattern that matches the pattern of the sensor data in the time period.

4. The continual engagement support device according to claim 3, further comprising an evaluation unit which evaluates the performance timing when the notification is made according to whether the target action is performed after the notification and/or a time elapsed from the notification to the performance of the target action.

5. The continual engagement support device according to claim 1, further comprising:
a discriminant model construction unit which constructs a discriminant model to determine whether a timing is the performance timing from input data including at least arbitrary time data and arbitrary sensor data, based on the performance data, and
a discriminant model storage unit which stores the discriminant model,
wherein the timing detection unit detects the performance timing based on discrimination results obtained as a result of inputting latest sensor data and time data indicating a current time into the discriminant model.

6. The continual engagement support device according to claim 5, further comprising an evaluation unit which evaluates the performance timing when the notification is made according to whether the target action is performed after the notification and/or a time elapsed from the notification to the performance of the target action.

7. The continual engagement support device according to claim 1, further comprising an evaluation unit which evaluates the performance timing when the notification is made according to whether the target action is performed after the notification and/or a time elapsed from the notification to the performance of the target action.

8. The continual engagement support device according to claim 7, wherein
the notification unit changes a notification frequency of the performance timing based on evaluation by the evaluation unit.

9. A continual engagement support method,
wherein an information processing device:
stores performance data including performance data including time data indicating a time of performance and sensor data of the time of performance or a surrounding time obtained from sensors mounted on a portable terminal when a target action is performed via the portable terminal possessed by a target user, in a predetermined storage device;
detects performance timing at which the target user is likely to perform the target action during a predetermined cycle, based on the performance data;

provides a notification to prompt performance of the target action at the detected performance timing when the target action is not performed for a predetermined period of time or longer;

switches between a notification phase where the notification is made and a normal phase where the notification is not made; and detects whether the target action is performed for each of a plurality of cycles and switches from the normal phase to the notification phase when the target action is not performed for a predetermined number of consecutive cycles, wherein only during the notification phase is the notification provided to prompt the performance of the target action at the performance timing that has been detected.

10. A non-transitory computer readable recording medium in which a continual engagement support program is recorded, the continual engagement support program causing a computer to execute:

storing performance data including performance data including time data indicating a time of performance and sensor data of the time of performance or a surrounding time obtained from sensors mounted on a portable terminal when a target action is performed via the portable terminal possessed by a target user, in a predetermined storage device;

detecting performance timing at which the target user is likely to perform the target action during a predetermined cycle, based on the performance data;

providing a notification to prompt performance of the target action at the detected performance timing when the target action is not performed for a predetermined period of time or longer;

switching between a notification phase where the notification is made and a normal phase where the notification is not made; and detecting whether the target action is performed for each of a plurality of cycles and switches from the normal phase to the notification phase when the target action is not performed for a predetermined number of consecutive cycles, wherein only during the notification phase is the notification provided to prompt the performance of the target action at the performance timing that has been detected.

* * * * *